Oct. 4, 1927.

G. E. CUTTAT 1,644,566

TURRET LATHE

Filed Feb. 27, 1923   3 Sheets-Sheet 2

Inventor
G.E. Cuttat,
By 
Attys.

Oct. 4, 1927. 1,644,566
G. E. CUTTAT
TURRET LATHE
Filed Feb. 27, 1923   3 Sheets-Sheet 3
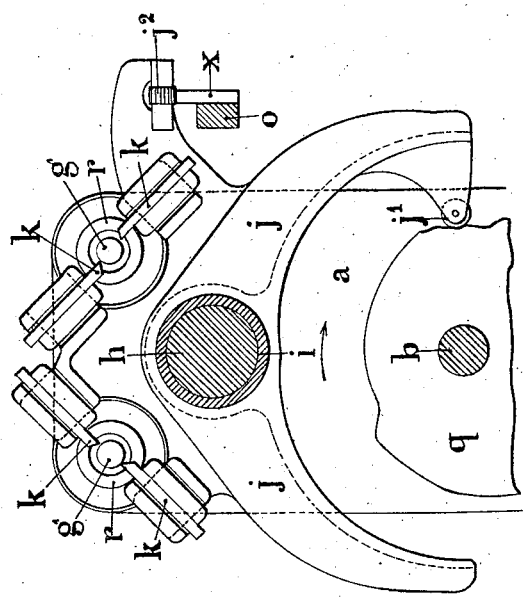
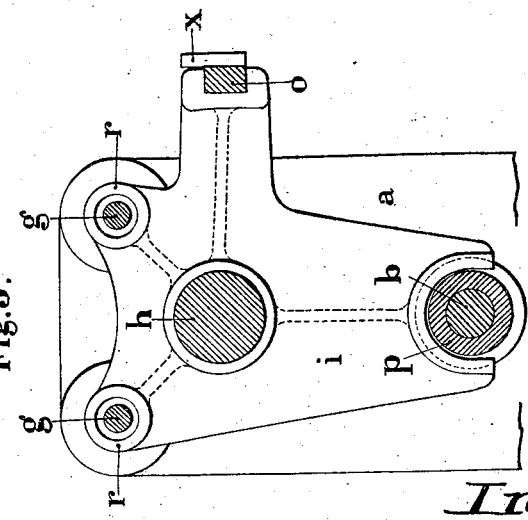
Inventor
G. E. Cuttat,
By Marks & Clerk
Attys.

Patented Oct. 4, 1927.

1,644,566

UNITED STATES PATENT OFFICE.

GEORGES EMILE CUTTAT, OF PARIS, FRANCE, ASSIGNOR TO THE SOCIÉTÉ ANONYME DES ANCIENS ETABLISSEMENTS CUTTAT & CIE., OF PARIS, FRANCE.

TURRET LATHE.

Application filed February 27, 1923, Serial No. 621,608, and in France April 7, 1922.

This invention relates to improvements in automatic and semi-automatic lathes in which the control of the tools by means of a tilting device permits the simultaneous machining of several bars without interruption.

In these lathes, each bar is operated upon by a set of tools moved according to the shape of the member to be obtained. As many sets of tools can be used as there are bars capable of being operated upon at the same time by the machine.

In the type of lathe forming the subject-matter of the present invention, the various sets of tools adapted to operate on the different bars are mounted on a single tool-carrier movable about a fixed axis from which the various sets of tools are equidistant; the angular position of this tool-carrier is determined by a single adjusting member, such as a cam, which thus constantly adjusts, relatively to the bars to be turned.

This type of lathe is moreover characterized by the fact that this single tool-carrier is moved axially along the shaft on which it is mounted by a second adjusting member, such as a cam, for the purpose of imparting to the tools a longitudinal displacement on the bars to be operated upon.

This system of tilting and longitudinally movable tool-carrier can also be applied in the case of a tool-carrier having only one set of tools operating upon one bar only.

A lathe constructed in accordance with the present invention possesses the following advantages:

1.—Identical and simultaneous adjustment of all the sets of tools, these sets being mounted on one and the same member, thus minimizing also the difficulties of adjustment.

2.—Simplicity of construction, since the control of the various sets of tools is quite as simple as in the case of a machine operating upon one bar only at a time, resulting in the possibility of increasing the number of sets of tools to thus obtain a production in proportion to the number of sets of the machine without complicating the adjusting mechanism for the tools.

3.—The longitudinal movement of the tilting device carrying the sets of tools being directly obtained by a single cam permits turning out work of great length with precision.

In accordance with this invention, the turret lathes are also provided with a very simple device having an inclined surface permitting the work to be tapered or otherwise shaped.

These improvements will be described hereafter, by way of example, with reference to the accompanying drawing in which:

Fig. 3 is a section taken on the line A—A of Fig. 1 looking towards the right of this latter figure.

Fig. 4 is a section taken on the line B—B of Fig. 1, looking towards the right of this latter figure.

Figure 1:
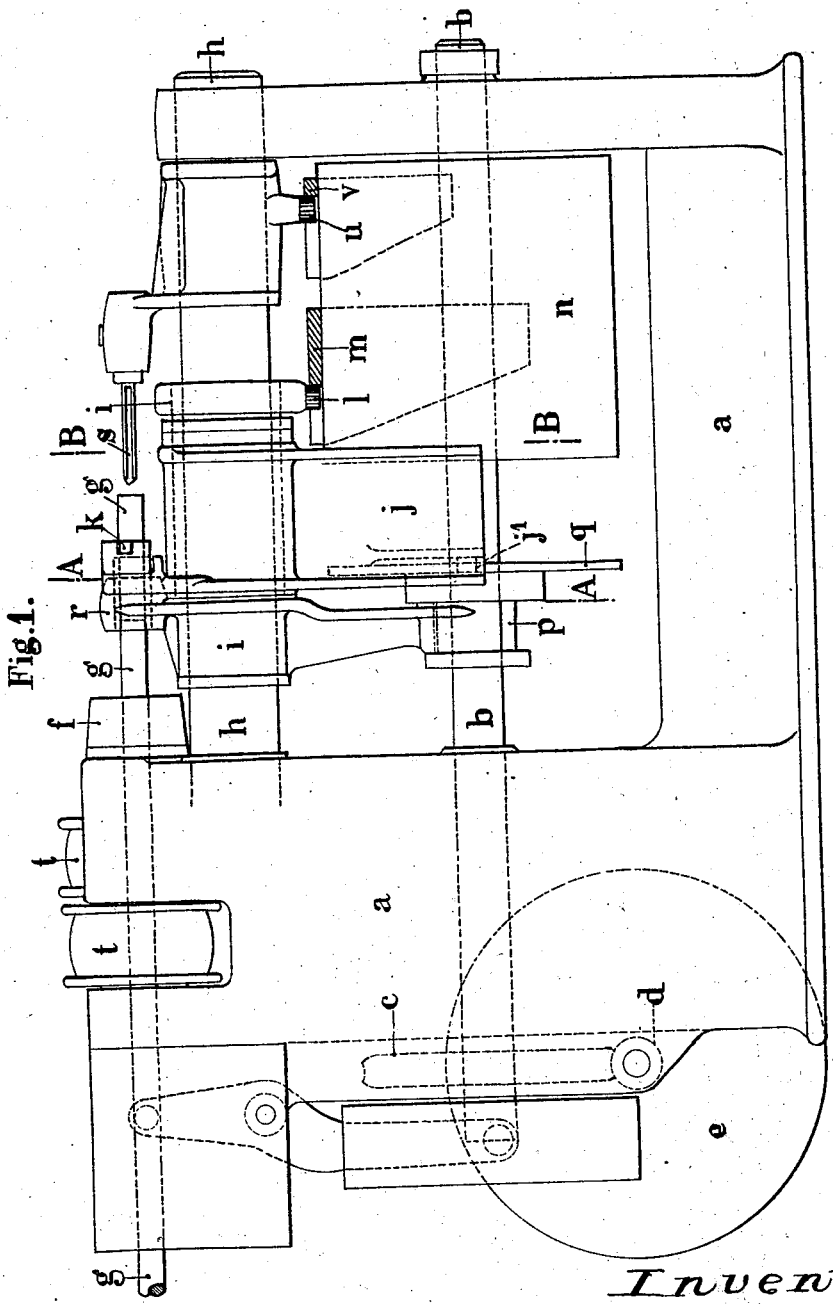
Fig. 1 is an elevation of a turret lathe provided with the improvements.
Figure 2:
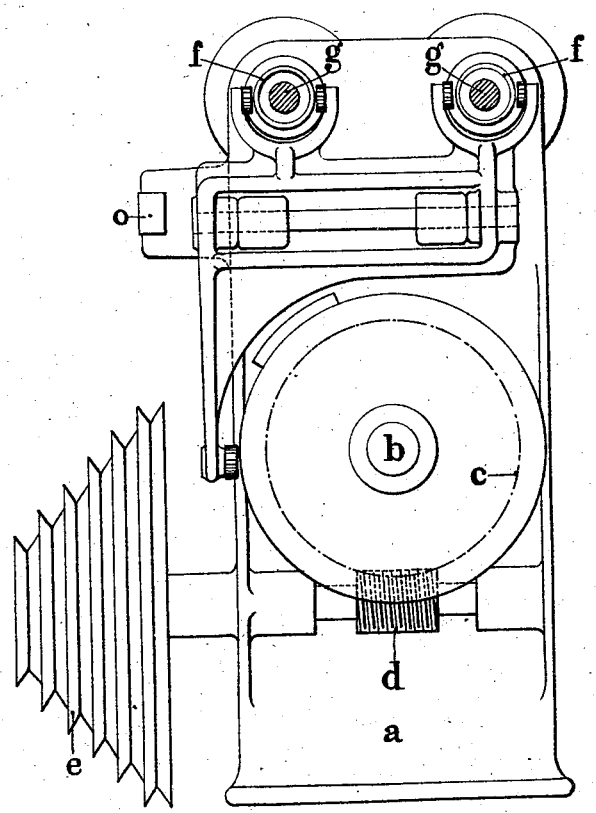
Fig. 2 is an end elevation thereof.
Figure 5:
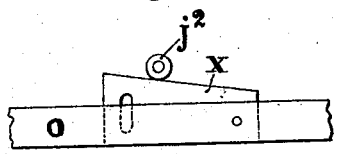
Fig. 5 is a detail of a part of the lathe.

As shown in the drawing, this machine comprises a frame $a$ supporting a central shaft $b$ driven by a wheel $c$ gearing with a worm $d$ connected with a cone pulley $e$.

In the upper part of the frame $a$ are rotatably mounted two hollow shafts $f$ through which pass the bars $g$ to be operated upon and held in the ordinary manner by clamping members.

Between the central shaft $b$ and the hollow shafts $f$, a guide-bar $h$ connects the two upright ends of the frame $a$.

On this guide-bar $h$ can slide a carriage $i$ forming the journal of a tilting device $j$ which carries the two sets of tools $k$ operating upon the two bars $g$. Through the medium of this tilting device and the opposed relation of the tools of each set, when the lower tool of the right-hand set operates, the upper tool of the left-hand set operates also, and reversely.

The journal-carriage $i$ is moved axially along the guide $h$ by a roller $l$ engaged and actuated by the cam $m$ secured on the drum $n$ rigid with the central shaft $b$. A bar $o$ holds the carriage $i$ for preventing its rotation about the guide-bar $h$.

The carriage $i$ is provided with a depending yoke member engaging a sleeve $p$ on which is secured a cam $q$ which imparts the tilting or oscillating movement to the tilting device $j$ through the medium of the roller $j^1$. This sleeve is driven by a key secured on the central shaft $b$. The journal-carriage $i$ is provided with two stays $r$ adapted to support the bars $g$ during the operation of the tools $k$. In the case of short pieces these two stays are not necessary.

On the guide-bar $h$ can be secured various apparatuses $s$, for drilling, threading or otherwise treating the work.

The work clamping devices on the hollow shafts $f$ and the feed of the work bars $g$ to be operated upon as well as the means for rotating the latter are provided as usual in automatic lathes.

During the time the bars $g$ are rotated by power applied to the pulleys $t$, the tools $s$ are fed along the guide-bar $h$ by means of the roller $u$ engaging the cam $v$ secured on the drum $n$.

On the bar $o$ is secured an adjustable device $x$ having an inclined or other surface which acts on the tilting device $j$ through the medium of the roller $j^2$ and permits the turning of conical or other shaped work. This inclined plane ensures the rigorous operation of the lathe, as the former or the member acts without intermediate countershaft on the tilting device $j$ carrying the two sets of tools $k$.

In case this device is not used, there is no action of cam on the tilting device.

The forms, details, accessories, materials and dimensions of the above devices may of course be varied without departing thereby from the principle of the invention.

Claims:

1. In lathe structure, a support, a guide, a tool carrier movable about said guide, a plurality of sets of tools mounted on said carrier and arranged equidistant from said guide whereby to produce identical cuts in separate pieces of work during movement of the carrier about said axis, a shaft arranged parallel to said guide, said tool carrier including an arm, a roller on said arm, a cam on said shaft engaged by the arm of the carrier for moving the latter about said axis to effect similar adjustment of the several sets of tools, said tool carrier being movable in the direction of said guide and means adjusting said carrier in the direction of guide.

2. A lathe structure as claimed in claim 1 characterized in that the carrier is substantially inverted U-shaped and is arranged beneath the sets of tools whereby to deflect material cut by the tools laterally from the lathe.

3. A lathe structure as claimed in claim 1 characterized in that the means adjusting the carrier in the direction of the guide includes a cam carried by said shaft.

4. A lathe structure, a support, a fixed guide arranged in said support, a member mounted for sliding movement on said guide in the direction of the axis of the latter, a tool carrier mounted to turn about said slidable member and movable with the latter in the direction of the axis of the guide, work guiding members carried by the slidable member arranged symmetrically with respect to the axis of the guide, a driving shaft, a cam operated by said driving shaft and coacting with the tool carrier to swing the latter about the guide, a plurality of sets of tools on the tool carrier, means for moving said cam along the driving shaft in synchronism with the movement of the slidable member along the guide and means operated by said guide shaft for effecting adjustment of the slidable member along said guide.

The foregoing specification of my "improvements in turret lathes", signed by me this 8th day of February, 1923.

GEORGES EMILE CUTTAT.